United States Patent [19]

Blaschke

[11] Patent Number: 4,626,761
[45] Date of Patent: Dec. 2, 1986

[54] METHOD AND APPARATUS FOR DETERMINING THE FLUX VECTOR OF A ROTATING FIELD MACHINE

[75] Inventor: Felix Blaschke, Erlangen, Fed. Rep. of Germany

[73] Assignee: Siemens Aktiengesellschaft, Munich, Fed. Rep. of Germany

[21] Appl. No.: 733,484

[22] Filed: May 10, 1985

[30] Foreign Application Priority Data

May 18, 1984 [DE] Fed. Rep. of Germany ....... 3418640

[51] Int. Cl.$^4$ ............................................. H02P 5/40
[52] U.S. Cl. ................................. 318/803; 318/805; 318/808; 324/158 MG
[58] Field of Search ....................... 318/803, 805, 808; 324/158 MG

[56] References Cited

U.S. PATENT DOCUMENTS 4,388,577 6/1983 Blaschke et al. .................... 318/717
4,423,367 12/1983 Blaschke et al. .................... 318/803

Primary Examiner—David Smith, Jr.
Attorney, Agent, or Firm—Kenyon & Kenyon

[57] ABSTRACT

For determining the flux vector, an EMF vector ($\underline{e}_s$) is formed in an EMF detector (15) from the stator current and the stator voltage, the components of which are determined in a rotating coordinate system rotated by an angle ($\beta$) relative to the coordinate system which is fixed with respect to the stator. The flux vector ($\psi_\beta$) is formed in the rotating coordinate system, taking into consideration the rotary EMF component ($e_\beta{}^R$) which is generated from the flux vector through rotation by $\pi/2$ and multiplication by the frequency of rotation ($\dot\beta$). The angle of rotation ($\beta$) is determined by feeding the direction deviation of the flux vector ($\psi_\beta$) or a reference vector ($\psi^*$) for the flux vector by the angle ($\beta$) to a servo control (27 or 30, respectively), the output signal of which is fed as the speed of rotation ($\dot\beta$) via an integrator (20) for forming the angle of rotation ($\beta$).

11 Claims, 8 Drawing Figures

METHOD AND APPARATUS FOR DETERMINING THE FLUX VECTOR OF A ROTATING FIELD MACHINE

BACKGROUND OF THE INVENTION

The present invention relates to a method for determining the flux vector of a rotating field machine. The invention relates further to apparatus for carrying out the method as well as to its application.

A method for determining the flux vector of a rotating field machine is used in the apparatus according to German OS No. 30 26 202 for the field-oriented operation of a converter-fed rotating-field machine. In field orientation, the position of the flux vector is determined and the converter supplying the machine is controlled as a function of the position of the flux vector in such a way that the component of the stator current parallel to the flux and the stator current component orthogonal thereto can be influenced independently of each other. Via the control of the stator current component parallel to the flux (magnetizing current), a predetermined value for the magnitude of the flux can be set, while the current component orthogonal to the flux (active current) then enters linearly into the torque and can be used directly for the decoupled control of the speed or the torque.

For this field orientation, however, the knowledge of the flux position is necessary. In this connection, it is of advantage not to measure the flux directly via Hall probes, but by means of a computer model circuit of the electrical quantities. The simplest model for this is a so-called "voltage model", which determines the induced EMF by means of an EMF detector from the input voltages of the motor by subtracting the ohmic stator voltage drop and the inductive leakage voltages. The flux is then obtained as an integral of the EMF.

For describing the machine currents, machine voltages, the EMF and the flux, plane vectors can be used which are given by two defining quantities, for instance, their Cartesian or polar components relative to a stationary (i.e., stator-oriented "fixed-in-space") or rotating with the rotor axis ("rotor-oriented") or rotating with the field axis ("field-oriented") coordinate system. For the mentioned "voltage model", viewing in the stator-oriented Cartesian coordinate system is simplest, because for this purpose it is only necessary to form, for instance, in the case of a three-phase machine, from the voltages and currents of the three phases shifted 120° relative to each other by means of a "3/2" coordinate converter, the corresponding Cartesian components fixed in space (designated here with the subscripts s1 and s2) of the corresponding stator current vector $\underline{i}$ and the stator voltage vector u, wherein the vector $\underline{e}$ of the EMF is then calculated by component-wise addition according to $\underline{e} = \underline{u} - r^s \cdot \underline{i} - l^\sigma \cdot d\underline{i}/dt$, taking into consideration the stator resistance $r^s$ and the leakage inductance $l^\sigma$. The Cartesian stator-oriented components of the flux vector $\underline{\psi}$ are then obtained as the integral of the corresponding component of the EMF vector.

The open integrators required for this integration have a tendency to drift off and must be stabilized, for instance, via a null register inserted into a feedback line of the integrator. These null regulators thus form from the control deviation of the d-c components contained in the flux components respective feedback signals, from which the starting quantity for the subsequent integration by subtraction from the EMF components fixed in space is obtained.

However, with the null drift of the integration, also the correspondingly slow changes of the flux components are suppressed at low operating frequencies. In steady-state operation, an angle error is also generated which has an effect likewise primarily at low frequencies and leads to a disturbing misorientation if the reference values for the stator current are pre-set with field orientation. These disadvantages are counterbalanced, however, by the good dynamics of this voltage model.

It is possible, however, to determine a model value for the machine flux from the machine currents (i.e., the stator current vector $\underline{i}$ and, in the case of a synchronous machine, also the field current $i^e$) and the measured rotor position, or, what frequently is advantageous from a measurement point of view, from the rotor speed of rotation. This "current model" electronically simulates the events occurring in the machine as far as they lead to the development of the flux. For this current model, the use of a field-oriented coordinate system is of advantage, the component parallel to the field being designated with the subscript $\varphi_1$ and the components orthogonal thereto with the subscript $\varphi_2$. The conversion from one coordinate system to another coordinate system rotated by a given angle is accomplished by the provision that the corresponding components of the vector to be transformed are fed to a so-called "vector rotator", to the angle input of which a suitable angle signal is applied, for instance, sine and cosine of the angle of rotation.

In the case of the current model, model parameters as accurate as possible must be set-in for the machine parameters, so that, for instance, changes of the rotor resistance due to the temperature lead to inaccuracies of the model flux in stationary as well as dynamic processes. For higher operating frequencies, the voltage model should heretofore be preferred, but at low frequencies, the current model leads to a better model value for the flux in spite of possible steady-state inaccuracies.

In the mentioned German OS 30 26 202, a combination of both models is therefore provided. According to the voltage model, two components of a model EMF vector associated with the voltage model are formed from the machine currents and machine voltages, from which then the corresponding components of the flux vector related to this voltage model as the reference vector $\underline{\psi}^*$ for the null control are formed. The circuit operates with stator orientation and, for forming the flux, contains an integrator for every Cartesian EMF component. It is achieved thereby that the voltage model is slaved to the current model at least with regard to its steady-state behavior, so that the good dynamics of the voltage model are retained, but the better steady-state flux determination of the current model is utilized at low frequencies.

The outputs of the integrators and the correction control represent the respective Cartesian stator-oriented components of a rotating vector; they must therefore continuously process alternating quantities, which cannot only be a disadvantage at high operating frequencies, and requires, especially if digitized, a high computing speed.

If, for instance, a phase error of 1° in the flux determination must not be exceeded, the processing stages must not exhibit inertia greater than about 20 μs. This may seem to be easily realizable only in analog technology with linear components. However, already vector rotators and other components which work with pulse width multiplication and themselves perform smoothing with time constants of, for instance, 400 μs, generate phase errors which, in the case of a highly dynamic control of the rotating field machine must be compensated by additional devices.

Since the presently available digital computers have computing speeds of several 100 μs, the delays connected therewith do not seem to permit digitizing of such methods.

SUMMARY OF THE INVENTION

It is, therefore an object of the present invention to provide a method and apparatus for determining reference quantities of the flux vector of a rotating-field machine.

The above and other objects of the present invention are achieved by a method for determining the flux vector of a rotating field machine, comprising the steps of (a) forming, from the current ($i_s$) and the voltage ($u_s$) of the machine, the EMF-vector ($e_s$) of the machine, (b) modifying the EMF-vector by a feedback signal ($\dot{\beta}=\varphi_s$) derived from the flux vector to form a modified EMF-vector ($e_\beta$), (c) integrating the modified EMF-vector ($e_\beta$) to form the flux vector, (d) forming the modified EMF-vector ($e_\beta$) in a coordinate system derived from the feedback signal ($\dot{\beta}$), one axis of which rotates relative to the reference system of the stator of the machine, (e) integrating the modified EMF-vector in the rotating reference system, taking a rotary component ($e_\beta{}^R$) of the EMF into consideration, and (f) forming the feedback signal ($\dot{\beta}$) from the flux vector such that the frequency of the coordinate system is slaved to the motion of the flux vector ($\psi_\beta$).

BRIEF DESCRIPTION OF THE DRAWINGS

The invention will be explained in greater detail in the following detailed description with reference to the drawings, in which.

DETAILED DESCRIPTION

Figure 1:
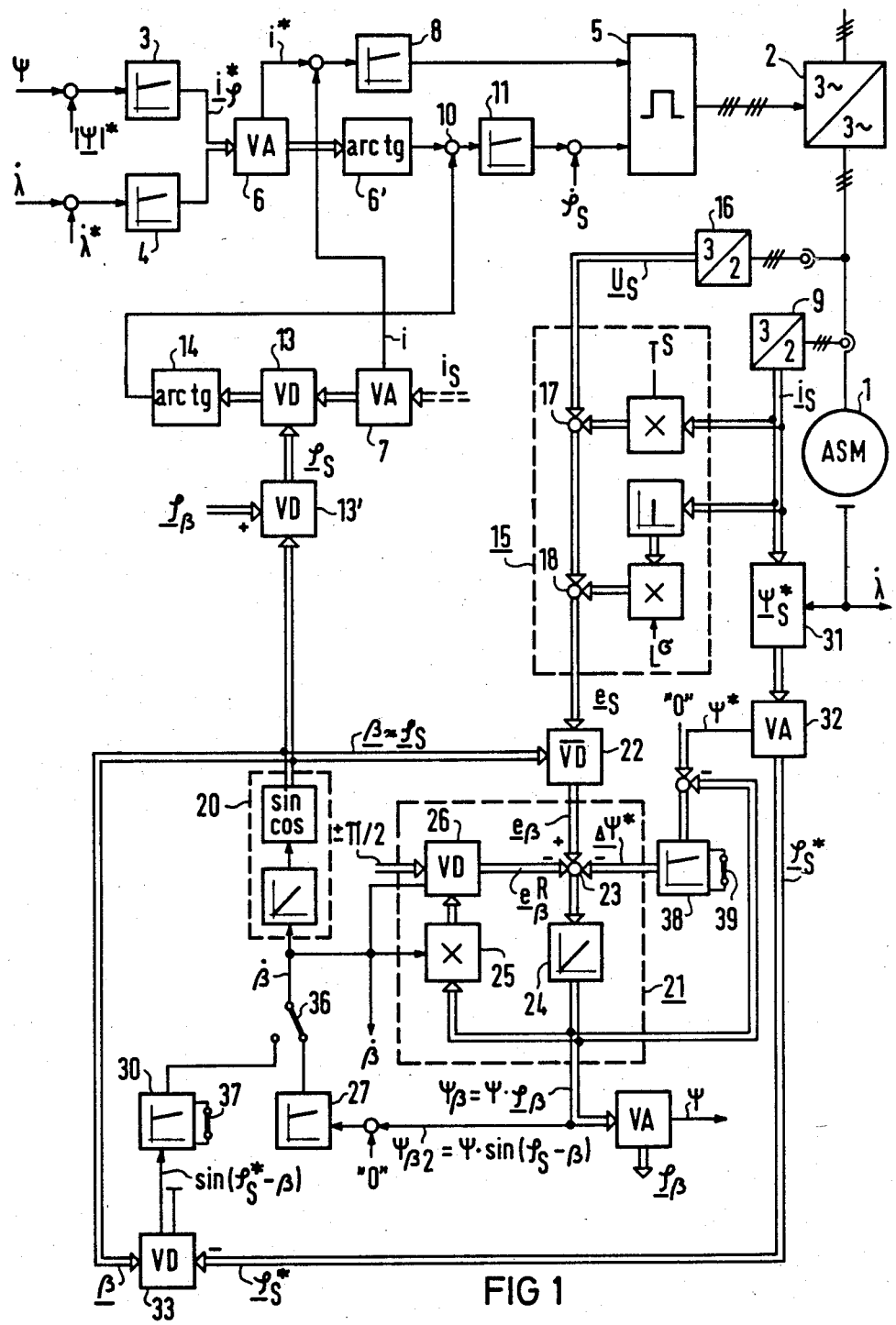
FIG. 1 shows the basic block diagram of a controller for an asynchronous machine.

The invention starts out from the fact that the mentioned delays cause no appreciable inaccuracies in the determination of the phase of the flux if d-c quantities are largely used instead of alternating quantities. For, the flux vector which is given by the flux magnitude $\psi$ and the flux angle $\varphi_s$ in the stator-oriented reference system and rotates with the frequency $\dot{\varphi}_s$, revolves in a reference system by a frequency $\dot{\beta}$ relative to the stator-oriented coordinate system only with the difference frequency $\dot{\varphi}_s - \dot{\beta}$; the components of the flux therefore assume in a rotating coordinate system the character of d-c voltages, the more the frequency of rotation of the coordinate system approaches the flux frequency.

Therefore, it is provided according to the invention to perform the integration leading from the EMF to the flux in a rotating reference system, i.e., to start with the integration not from the stator-oriented EMF vector $\underline{e}_s$ but from the EMF vector $\underline{e}_\beta$ which is modified by transformation into the rotating coordinate system.

A particularly practical rotating coordinate system has been found to be a coordinate system oriented to the rotor flux, i.e., a coordinate system which is connected to the flux vector as rigidly as possible.

Such a procedure is performed in three steps. In the first step, the EMF vector is determined in a coordinate system which is shifted relative to the stator axis S1 by the angle $\beta = \int \dot{\beta}\, dt$ (which is variable with the frequency $\dot{\beta}$). Such a coordinate system can technically be defined by a "vector oscillator". Such a vector oscillator can be conceived as an integrator for an input frequency, the output signal $\beta$ of which, as a polar angle coordinate of a unit vector, is converted by means of a function generator into the angle signal pair $\hat{\beta}$=cos $\beta$, sin $\beta$), i.e., into the stator oriented Catesian components of the corresponding unit vector.

In a second step must be taken into consideration in the integration of the ("modified") EMF vector given in these coordinates the rotary EMF component $e_\beta{}^R$ which, according to the physical relationship $d\psi_s/dt = e_s$ in the rotating reference system leads to the relation $\psi_\beta = \int (\underline{e}_\varphi + \underline{e}_\beta{}^R) dt$ with $e_{\beta 1}{}^R = \dot{\beta}\cdot\psi_{\varphi 2}$, $e_{\beta 2}{}^R = -\dot{\beta}\cdot\psi_{\varphi 1}$.

Technically speaking, this means that the flux vector obtained by the integration must be weighted on the one hand with the frequency $\dot{\beta}$ in a feedback loop and, on the other hand, shifted by $\pi/2$. This supplemental vector $e_\beta{}^R$ must then be added at the input of the integrators to the EMF $e_\beta$.

It must finally be achieved that the coordinate system rotates with the flux vector as rigidly in phase as possible. To this end, the frequency $\dot{\beta}$ of the reference system is slaved to the motion of the flux vector. Advantageously, a quantity is formed from the flux vector which becomes zero only if the direction of the flux vector (unit vector $\varphi_s$) coincides with the one rotating coordinate axis $B_1$. Such a quantity is, for instance, the angle difference $\varphi_s - \beta$ between the flux axis and the coordinate axis, a suitable trigonometric function (for instance, sin $(\varphi_s - \beta)$) of this angle or the component $\psi_{\beta 2} = \sin(\varphi_2 - \beta)$ of the flux vector which is perpendicular to the coordinate axis $\beta_1$. The frequency of the reference system is now readjusted so that this quantity disappears. If, therefore, especially this quantity is fed to a servo controller with the reference value zero, this controller furnishes as the output quantity the frequency $\dot{\beta}$ of the reference system which is required by the mentioned vector oscillator for forming the rotating reference system and for which then applies $\dot{\beta}=\dot{\varphi}_s$ or $\beta=\varphi_s$ in the adjusted state.

Thus one arrives at the arrangement according to FIG. 1, in which, as an example of a rotating-field machine, an asynchronous machine 1 is controlled by a converter 2 with a stator current of variable amplitude and phase or frequency.

The flux of a rotating-field machine is proportional to the stator current component $i_{\varphi 1}$ ("magnetizing current") parallel to the flux $\psi$ (magnitude $\psi$, angle $\varphi_s$ relative to the stator axis) and can therefore be pre-set as a correspondingly field-oriented control component $i_{\varphi 1}*$ of the stator current for instance, by a flux controller 3 from the control difference ($|\underline{\psi}|* - \psi$). With the flux constant, the stator current component $i_{\varphi 2}*$ ("active current") perpendicular thereto is proportional to the torque of the machine and can be pre-set, for instance, by a controller 4 for the speed of rotation λ as the second field-oriented control component $i_{\varphi 2}^*$ of the stator current.

So that the converter 2 of the machine actually impresses the desired stator current, it is necessary to convert this control vector $\underline{i}_\varphi^*$ given with field orientation in a suitable manner into control quantities for the stator-oriented stator current. In the example of FIG. 1, a vector analyzer 6 first determines the magnitude i* which is entered as the controlled quantity to the converter control unit through comparison with the actual current magnitude i formed by a vector analyzer 7 and via a following magnitude controller 8. The vector analyzer 7 is then given as the input the actual stator current vector $\underline{i}_s$ taken off by a 3/2 converter 9 at the terminals of the machine.

The vector analyzer 6 further determines the unit vector pointing in the direction of the reference current vector i* which is converted by means of the function generator 6' into the field-oriented current angle $\tan^{-1}(i_{\varphi 2}^*/i_{\varphi 1}^*)$. By comparison with the corresponding actual angle value which is fed by a vector rotator 13 following the vector analyzer with a function generator 14 to the control comparator 10, an angle control 11 can furnish therefrom the control variable for the stator-oriented current frequency which is fed to the corresponding frequency control input of the control unit 5 and leads to the situation that the stator current is impressed on the machine with a phase orientation $\tan^{-1}(i_{s2}/i_{s2})=\varphi_s+\tan^{-1}(i_{\varphi 2}^*/i_{\varphi 1}^*)$ which is preset with field orientation by $\tan^{-1}(i_{\varphi 2}^*/i_{\varphi 1}^*)$ and transformed to the stator orientation.

To the controller 11 can further be fed the field frequency so that the impressed current angle is automatically modulated with the flux angle $\varphi_s = \int \dot{\varphi}_s\, dt$ and the angle controller 11 has to level out only the angle deviation $\tan^{-1}(i_{\varphi 2}^*/i_{\varphi 1}^*) - \tan^{-1}(i_{\varphi 2}/i_{\varphi 1})$.

The field orientation of the rotating field machine control always requires information regarding the flux angle in order to go from the field-oriented control variables $i_{\varphi 1}^*$, $i_{\varphi 2}^*$ to the stator-oriented control variables of the converter (here, amplitude and frequency of the stator current). In FIG. 1, this angle information is required as the vector $\varphi_s$ for the vector rotator 13 which is preceded by a vector rotator 13' in order to convert, corresponding to the angle addition $\varphi_s = \beta + \varphi_\beta$, the flux angle $\varphi_\beta$ determined in the $\beta$-coordinate system (angle between the axis $\beta$ given by the stator-oriented components cos $\beta$, sin $\beta$ and the flux vector $\psi_\beta$ determined in the $\beta$-oriented coordinate system) into the stator-coordinate system. The method according to the invention now serves for determining the actual magnitude of the flux $\psi$, the corresponding flux angle $\varphi_\beta$ or $\varphi_s$ as well as the flux frequency.

First, an EMF detector 15 is provided, which forms the stator-oriented EMF vector $e_s$ from the stator-oriented voltage vector $u_s$ taken off via a 3/2-converter 16 at the machine terminals at the subtraction points 17 and 18 by means of the parameters $r^s$ for the ohmic stator resistance and for the leakage inductance of the machine by subtracting the vectors $r^2 \cdot i_s$ and $l^\sigma d/dt\, i_s$.

The already explained vector oscillator 20 furnishes from an input variable corresponding to the frequency $\dot{\beta}$ of a rotating coordinate system, the signal $\beta$ which describes the angle of rotation $\beta$ of the rotating coordinate system relative to the coordinate system fixed to the stator, which yields the stator-oriented components of the coordinate axis and, in the balanced condition, the direction of the flux axis.

In the integration stage 21, the EMF-vector is now integrated, taking into consideration the rotary component $\underline{e}_\beta^R$ in the rotating coordinate system. To this end, a vector rotator 22 first transforms the stator-oriented components of $\underline{e}_s$ into the corresponding EMF components of the vector $e_\beta$ in the rotating coordinate system by means of the angle signal $\beta$. Via the adding stage 23, these transformed components are fed to two integrators (which are shown in FIG. 1 as a single symbol 24) for integration component-wise. The mentioned rotary component $\underline{e}_\beta^R$ is formed by multiplying the integrator output signals finally obtained as the components $\psi_{\beta 1}$ and $\psi_{\beta 2}$ of the flux by the frequency $\dot{\beta}$ component-wise (multiplier 25) and interchanging the two components, according to the law of formation of the rotary component, taking into consideration a change of sign in their relationship to the coordinate axes of the rotating coordinate system. This interchange corresponds ultimately to a rotation by $\pi/2$ and is therefore shown in FIG. 1 as a vector rotation (vector rotator 26). The rotary component formed by the vector rotator 26 is then fed to the adder 23.

From the component $\psi_{\beta 2} = \psi \cdot \sin(\varphi_s - \beta)$ formed by the integration stage 21 the frequency $\dot{\beta}$ required by the multipliers 25 and the vector oscillator 20 is now formed via a pi-controller 27 by the reference value $\psi_{\beta 2}^* = 0$. The controller 27 thereby forces the component $\psi_{\beta 2}$ of the flux $\psi$ perpendicular to $\beta$ to be leveled out quickly. Thus, the vectors $\psi_s = (\psi \cos \varphi_\beta; \psi \sin \varphi_s)$ and $\beta = (\cos\beta, \sin \beta)$ point stationarily in the same direction ($\beta = \varphi_s$), and for low dynamic requirements for the rotating-field machine control, $\varphi_s \approx \beta$ can be set as the flux angle and $\psi \approx \psi_{\beta 1}$ as the flux magnitude.

Instead of the servo control 27 acted upon by $\psi_{\beta 2}$, however, also the servo control 30 can be used, if at least the steady state of the flux is known by other means. At the outset, for instance, the "current model" was already mentioned as an example of a different circuit for determining the flux. Since furthermore the flux vector determined by the modules 15 and 21 enters into the control of the machine and therefore into the formation of the actual flux, it can frequently be calculated from reference and/or actual values formed in the control, how the steady state of the rotating-field machine adjusts itself.

Therefore, a current model 31 or also any other device can be used which makes available a control vector $\psi_s^*$ which represents at least the steady state of the field with sufficient accuracy by a reference angle $\varphi_s^*$ and a reference amplitude $\psi^*$ (for the steady state with $\varphi_s = \beta = \varphi_s^*$, and thus by the field-oriented components $\psi_{\beta 1}^* = \psi_1$ *$\psi_{\beta 2}^* = 0$). A vector analyzer 32 permits here to make available the magnitude $\psi^*$ and the corresponding angle signal $\varphi_s^*$. From the two angle signals $\varphi^*$ and $\beta$, an angle difference former (for instance, the vector rotator 33) yields the corresponding difference angle $\varphi_s^* - \beta$ (or sin $(\varphi_s^* - \beta)$) as the input signal for the controller 30. This controller 30 can now likewise make available the required frequency $\dot{\beta}$ for the vector oscillator 20. A double-throw switch 36 shows that only one of the two possibilities for determining $\dot{\beta}$ is necessary, or that one can switch between the two possibilities. A shorting switch 37 allows the controller 30 to be not engaged and can be set to zero if the frequency $\dot{\beta}$ is given by the servo control 27.

Similarly, a corresponding magnitude control 38 with a shorting switch 39 for deactivating it is also provided for the magnitude $\psi^*$. This magnitude control allows the calculated flux vector $\psi_\beta$ to coincide in the steady state with the control vector $\psi_s^*$ given in field orientation by $\psi_{\beta1}^* = \psi^*$ and $\psi_{\beta2}^* = 0$. In the embodiment according to FIG. 1, this control is realized as a vector control (one control for every vector component) and furnishes the components of a first correction vector $\Delta\psi^*$ which is likewise added at the addition point 23.

The position of the double-throw switch 36 shown in FIG. 1 in which the controllers 30 and 38 are not in engagement, is provided particularly for uncontrolled operation, where the rotating-field machine runs at high speed of rotation and the induced voltages therefore have a high level permitting high computing accuracy. At low speeds, however, the danger exists that this voltage model has considerable calculating errors which lead to inaccuracies of the flux in the steady state. In this case, one can go to controlled operation by switching the switch 36 and activating the controllers 30 and 38, in which the voltage model is controlled by the current model 31 or another device furnishing a reference vector $\psi_s^*$.

In the controlled state, stationary computing errors are suppressed by the intervention of the control vector, but the dynamics of the voltage model remains intact. The transition from the controlled to the uncontrolled state can be made in one step or also gradually by alternately opening and closing the double throw switch 36. Deviating from FIG. 1, it may also be provided to use the voltage model separated from the described intervention into the machine in order to determine the flux of the machine for monitoring and adjusting purposes. Thus, other methods are known, for instance, in which determining the flux from the current and the voltage is required in order to determine, for instance, the rotor resistance of the machine from a comparison of the flux determined by the voltage model with a flux determined by other means.

In the circuit according to FIG. 1, the EMF detector requires the vector $\sigma d/dt \, \underline{i}_s$ of the leakage voltage drop of the machine. Since the current can be differentiated by technical means only imperfectly, a circuit according to FIGS. 12 and 13 of German OS 30 34 275 is advisable which is reproduced here in FIG. 2 and forms as an EMF vector a vector $\underline{e}_s$ of the smoothed EMF which is defined by the smoothing time constant t and the Laplace variable s according to $$\underline{e}_s = \frac{1}{1+st}\left(\underline{u}_s - r^s \cdot \underline{i}_s - l^\sigma \frac{d \underline{i}_s}{dt}\right)$$

This circuit contains between the subtraction points 17 and 18 of the EMF detector 15 an integrator 50 (FIG. 2) with the time constant t, wherein the integral $1 \cdot \sigma \underline{i}_s$ of the leakage voltage drop vector is fed to the subtraction point 18 instead of its integral. To the subtraction point 17 is further added negatively the output vector of the EMF detector, i.e., the smoothed EMF vector $\underline{e}_s$.

Figure 2:
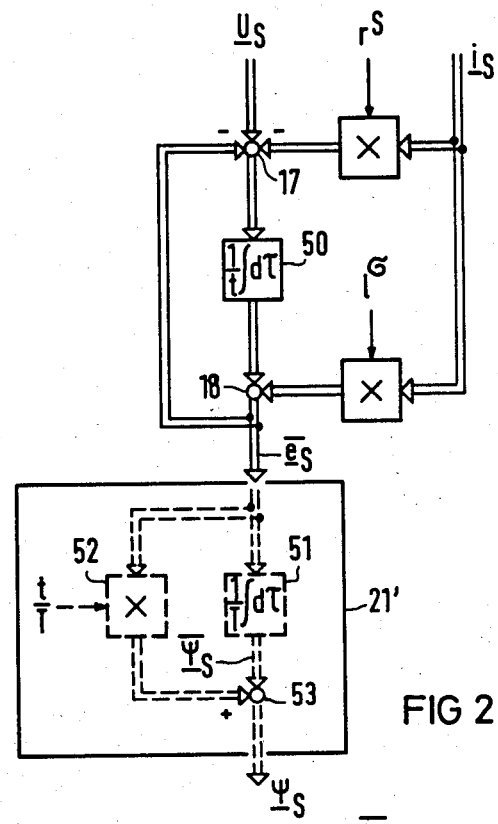
FIG. 2 shows the block diagram of part of a modified version of the apparatus of FIG. 1.

For dynamic processes, however, this smoothing causes a phase shift. This phase shift can be taken into consideration in the succeeding integration which is indicated in FIG. 2 for the stator oriented components of the vector $\underline{e}_s$ by an integrator 51 with the time constant T leading to the smoothed flux $\overline{\psi}_s$ by the provision that to the integral of the smoothed vector, the smoothed EMF vector $\overline{\underline{e}}_s$ multiplied by the smoothing time constant t (or the quotient t/T, multiplier 52) at an adding point 53. Thereby, the unsmoothed flux vector $\psi_s$ is formed with the correct phase.

Figure 3:
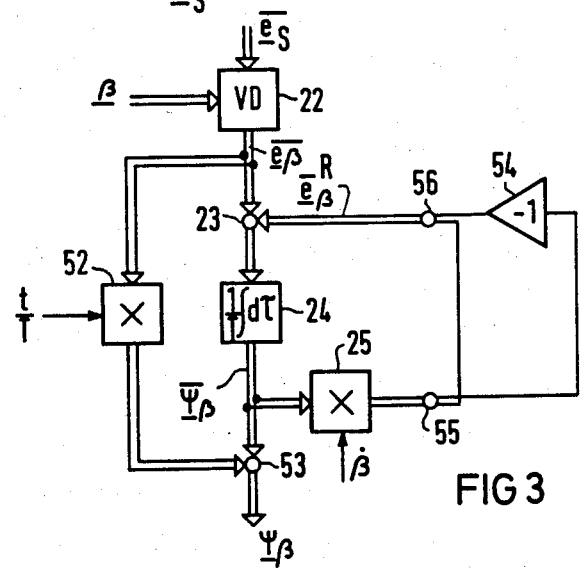
FIG. 3 shows the block diagram of part of a further modified version of the apparatus of FIG. 1.

This integrating circuit 21' for integrating the smoothed EMF vector with simultaneous compensation of the smoothing can also be applied to the rotating coordinate system. This is shown in FIG. 3, where the vector rotator 22 transforms the smoothed EMF vector into the rotating coordinate system by means of the angle signal $\beta$. The integrator 24 then carries out the component-wise integration in the rotating coordinate system, where the multiplier 25 multiplies the smoothed flux vector $\overline{\psi}_\beta$ obtained through the integration by the frequency of rotation $\dot{\beta}$ and the 90° rotation shown by the vector rotator 26 is realized by the sign reversal (inverter 54) and the interchange of the coordinate assignment between the terminals 55 and 56. The addition of the rotary component obtained in this manner at the adding stage 23 therefore leads to the situation that the integrator 24 furnishes the smoothed flux vector $\overline{\psi}_\beta$. The compensation of the smoothing can now be carried out by means of multipliers 52 and the adding point 53.

Figure 4:
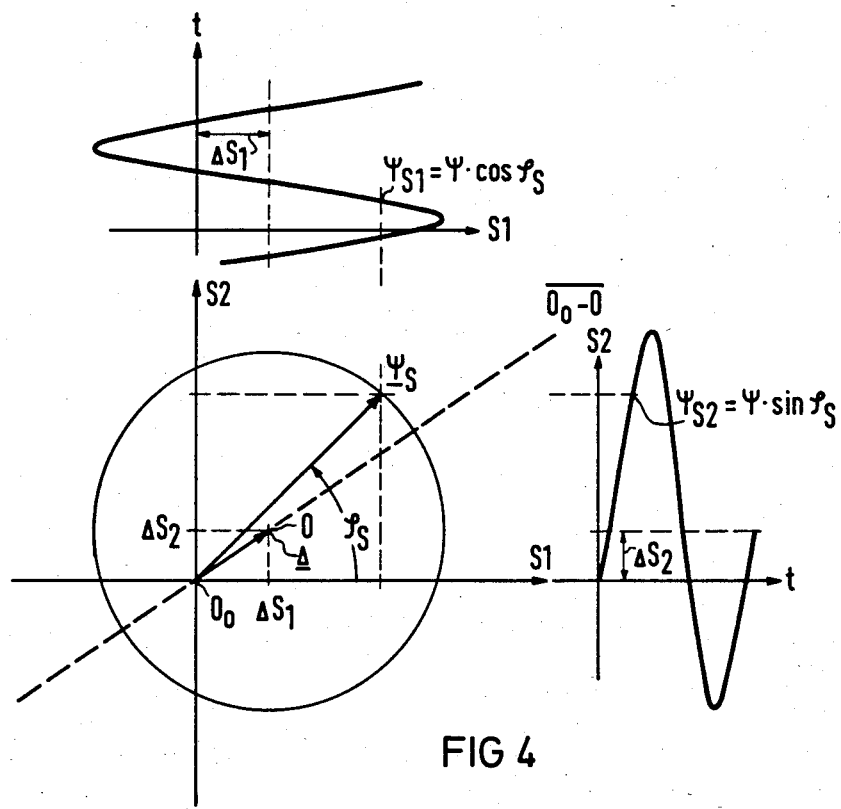
FIGS. 4, 5, 6 and 7 are graphs useful in explaining the operation of the apparatus of FIG. 1.

While in the controlled condition of the voltage model shown in FIG. 1, the corresponding servo controls 30, 37 level out the d-c component caused by integrator drift or other calculating errors by slaving to the control vector $\psi_s^*$, such integration errors cannot always be corrected automatically. FIG. 4 shows the locus of the flux vector $\psi_s$ sin stator-oriented coordinates as well as the course of the components $\psi_{s1}$ and $\psi_{s2}$, where the null point 0 of the locus curve is shifted by the integrator drifts, in the steady state, by the vector $\underline{\Delta}$ (stator-oriented components $\Delta_{s1}$, $\Delta_{s2}$) designated as "eccentricity" or "d-c component vector" relative to the coordinate origin 0o.

In a further embodiment of the invention, it is now proposed to use for the integration, as a modified EMF vector, the vectorial sum of the EMF vector transformed into the rotating coordinate system and a correction vector $\delta\psi$, where the correction vector $\delta\psi$, in a particular simple embodiment, is provided in the rotating coordinate system parallel or antiparallel to the rotating coordinate axis $\varphi_2$ (this corresponds to the direction of the flux vector $\psi_s$ rotated by $\epsilon = \pm\pi/2$). The magnitude of the vector is determined by a so-called "volatile" quantity of the calculated vector, i.e., by a quantity which becomes zero in steady-state uniform revolution on a centered locus, but grows with increasing eccentricity. Such a quantity can, for instance, be the angular acceleration $\ddot{\varphi}_s = d\dot{\varphi}_s/dt$ which becomes positive above a straight line designated with $0_o - 0$ for positive rotation and negative in the other half-plane for positive rotation. Another preferred volatile quantity is given by the derivative $\dot{\psi}$ of the magnitude for positive rotation and is positive in the other half-plane.

Figure 5:
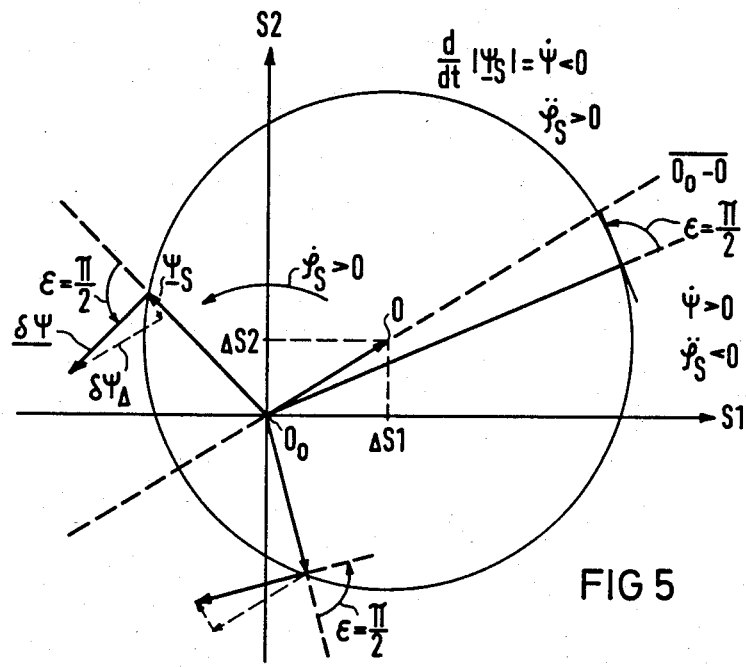
Figure 6:
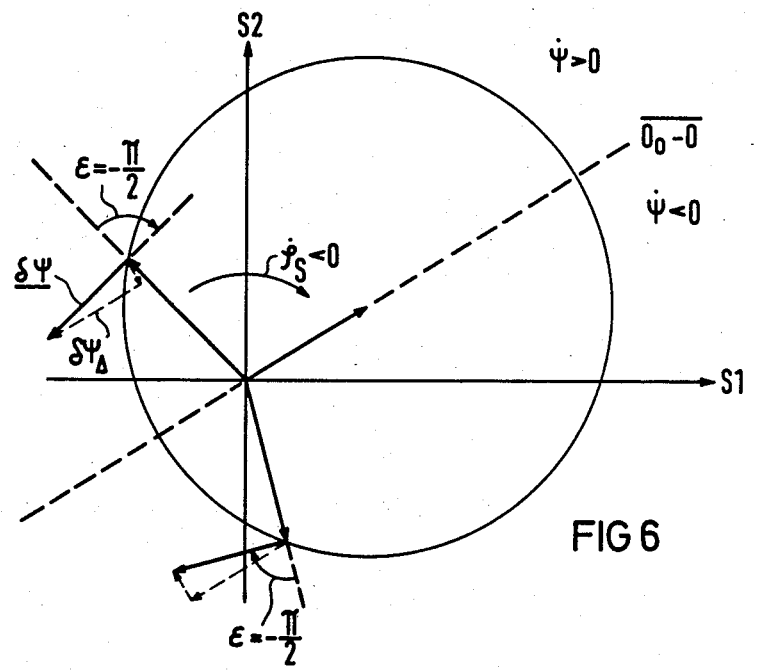

FIGS. 5 and 6 now show for an eccentric stator-oriented locus of the flux vector how the correction vector is formed by setting $\epsilon = \pm\pi/2$, i.e., by setting the vector $\underline{\epsilon} = (0, \pm 1)$ and the magnitude coordinate $\Delta = |\dot{\psi}|$. If the sign is chosen according to the sign of $-\dot{\psi}\cdot\dot{\varphi}_s$, the correction vector is obtained in FIG. 5 in the stator-oriented coordinate system by the components $\delta\psi_{\varphi1} = \dot{\psi}\cos\epsilon = 0, \quad \delta\psi_{\varphi2} = -\dot{\psi}\sin\epsilon = -\dot{\psi}$ $\delta\psi_{s1} = \dot{\psi}\cos(\epsilon + \varphi_s), \quad \delta\psi_{s2} = -\dot{\psi}\sin(\epsilon + \varphi_s)$ It is seen in FIG. 5 that with this setting of the correction vector, the component of the correction vector perpendicular to the d-c component vector is averaged away in one revolution, but the correction vector always has a component $\delta\underline{\psi}\Delta$ with a direction opposed to the d-c component vector $\underline{\Delta}$ for the different directions $\varphi_s$ of the flux vector shown in FIG. 5. FIG. 6 shows the corresponding relations for $\dot{\varphi}_s < 0$.

Figure 7:
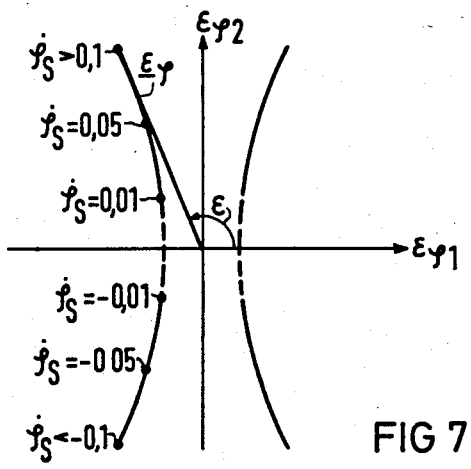

However, it is advantageous in many cases to set the angle $\epsilon$ between the correction vector $\delta\underline{\psi}$ and the flux axis $\varphi_s \approx \beta$ not as constant by $\pi/2$, but as a function of $\dot{\varphi}_s \approx \dot{\beta}$ and/or another state variable W characterizing the operating state of the rotating-field machine. Besides, it may be advantageous to set also the proportionality factor between the volatile quantity (here, $-\psi$) and the magnitude $|\delta\underline{\psi}|$ of the correction vector in dependence on the function. In field oriented $\underline{\varphi}_s$ coordinates (or in $\underline{\beta}$-oriented $\beta$-coordinates coinciding therewith in the steady state), the following correction vector is thereby arrived at $$\delta\underline{\psi} = -\psi \cdot \underline{\epsilon}(\dot{\varphi}, W) \text{ or } \underline{f\psi} = -\psi \cdot \underline{\epsilon}(\dot{\beta}, W)$$

in which $\underline{\epsilon}(\dot{\varphi}, W)$ and $\underline{\epsilon}(\dot{\beta}, W)$ respectively is a vector function, the locus of which in the $\varphi_s$- or $\beta$-oriented coordinate system is shown as an example in FIG. 7.

The correction vector $\int\psi$ is itself likewise "volatile", since it becomes $\int\psi=0$ in the steady state (corresponding to the volatile quantity itself). It causes damping in the flux determination and, via its intervention into the machine control, it also acts on the operation of the machine itself. For dynamic processes, in which also the reference vector $\psi_s^*$ is variable according to nonstationary states and therefore, for instance, a dynamic reference quantity $\psi^*$ can be determined from the current model or another device for the control of the machine, this damping may be undesirable and can be reduced by not directly using the magnitude of the correction vector obtained from the volatile quantity $\psi$ of the calculated flux vector $\underline{\psi}_s$, but the difference $\psi - \psi^*$. It has further been found that for the described damping the dynamic angle $\varphi_\beta$ can be ignored and $\varphi_s$ can be set $=\beta$, wherein, in addition, the volatile quantity $-\psi$ need not be formed first by differentiation at the output of the integrator circuit, but can be taken off in good approximation at the input of the integrator circuit, especially at the terminal for the field parallel EMF-component.

Therefore, proportionality with a proportionality factor $-\psi$ or $-(\psi-\psi^*)$, $-(e_{\beta 1}=\psi^*)$, $-(e\varphi_1-\psi^*)$ or a similar quantity exists between the correction vector $\delta\underline{\psi}$ and the vector function $\underline{\epsilon}(\dot{\varphi}s, W)$ and $\underline{\epsilon}(\dot{\beta}, W)$. The vector function $\underline{\epsilon}(\dot{\varphi}s, W)$ can therefore be used via the variable W (for instance, the angle between the voltage and the current of the machine) for a specified damping of certain dynamic operating states of the machine. In this connection, $\underline{\epsilon}(\dot{\varphi}s, W)$ and $\underline{\epsilon}(\dot{\beta}, W)$ can preferably be set as a control vector in the rotating coordinate system, of which the locus, depending on $\dot{\varphi}_s$, is given as an example in FIG. 7. The two branches of this locus curve correspond here to motor and generator operation.

It is seen that for higher frequencies, the angle is near 90° and the $\varphi_1$-component is preponderant over the $\varphi_2$-component only at frequencies near standstill. Standstill itself ($\dot{\varphi}_s=0$) is here a singular state, at which the speed of rotation of the coordinate system goes toward zero. In such a singular state, the correction vector is advantageously brought out of engagement. The component of the correction vector perpendicular to the flux vector is therefore zero. With this setting of the control vector $\underline{\epsilon}$ only if simultaneously also the correction vector $\delta\underline{\psi}$ itself becomes zero according to the magnitude of the volatile quantity.

FIG. 8 again shows by the example of a converter-fed field-oriented asynchronous machine, how these measures can be built into the machine control for smoothing the EMF vector and for damping the machine control.

For the field-oriented regulation or control of the asynchronous machine 1 via the converter 2, only the input of the field-oriented control vector $i_\varphi^*$ is given and the different possibilities and required transformation elements for forming the required controlled variables for the converter 2 from these field-oriented control quantities $i_{\varphi 1}^*$, $i_{\varphi 2}^*$, are represented only symbolically by the vector rotator 60. The flux angle $\varphi_s$ is formed here by means of a vector analyzer 70 and a vector rotator 71 according to the angle addition of the angle $\varphi\beta$ between the calculated field axis and the coordinate axis $\underline{\beta}$ and the angle $\beta$ between the axes $\underline{\beta}$ and s1.

The 3/2 converter 16 for forming the stator voltage vector $\underline{u}_s$ can advantageously be followed by a d-c component control, which carries the components of the stator voltage vector in a feedback loop via an integrating stage 61 with a long integration time, the output signals of which thus correspond to the d-c component in the componetns of the voltage vector and are added as the corresponding correction vector to the voltage vector $\underline{u}_s$ at a subtraction point 62.

63 designates the EMF detector for forming the vector $\underline{\bar{e}}_s$ of the smoothed EMF shown in FIG. 2. After the transformation (vector rotator 22) into the rotating coordinate system which becomes field-oriented by the slaving of the angle $\beta$ following the field angle $\varphi_s$, an integration circuit 64 designed in accordance with FIG. 3 carries out the integration, taking the rotary component into consideration.

To adding stage 23 is added the correction vector which is furnished by a correction vector former. The correction vector former contains as the direction-giving means a control vector former 65 which furnishes according to FIG. 7 the control vector $\underline{\epsilon}(\dot{\beta}, W)$ as a function of the speed of rotation $\dot{\beta}$, where it is indicated by the input for the state variable W that the control vector can be set-in also in functional dependence on a state variable W of the rotating-field machine. By component-wise multiplication by multipliers 66 which modify as magnitude forming means the magnitude of the control vector $\underline{\epsilon}$ according to the quantity-determining variable $\psi \approx \bar{e}_{\beta 2}$ or $\psi-\psi^*$, the correction vector $\delta\underline{\psi}$ is formed from the control vector. By the dashed lines, various means are indicated to set-in the factor of the multipliers 66.

Figure 8:
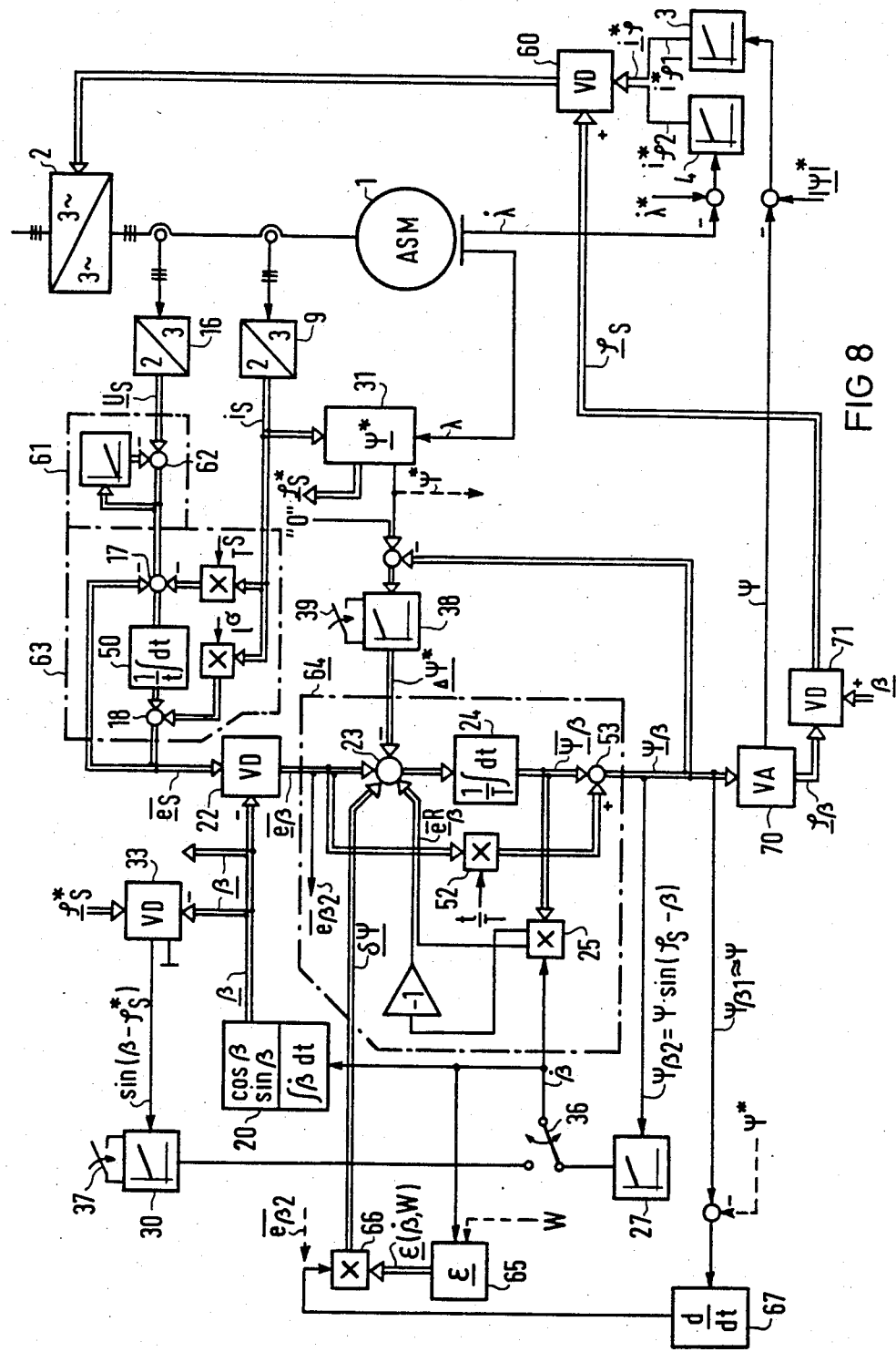
FIG. 8 shows a further block diagram of a controller for an asynchronous machine.

The further means shown in FIG. 8 which serve for slaving the rotating coordinate system according to the null deviation of the determined flux component $\psi_{\beta 2}$ perpendicular to the field or for the control deviation $\varphi_s^* - \beta$ of the angle coordinate of the reference angle $\varphi_s^*$, are taken from FIG. 1 and carry the same reference symbols.

The controllers 27, 30 and 38 as well as the integrators 24 therefore process in the invention only d-c quantities and therefore are no longer critical with regard to their control speed and their influence on the determination of the flux. Overall, a method and apparatus are thereby created which generate no disturbing errors and especially no phase shifts in the determination of the direction of the flux even at low processing speeds of the components used.

In the foregoing specification, the invention has been described with reference to a specific exemplary embodiment thereof. It will, however, be evident that various modifications and changes may be thereunto without departing from the broader spirit and scope of the invention as set forth in the appended claims. The specification and drawing are, accordingly, to be regarded in an illustrative rather than in a restrictive sense.

What is claimed is:

1. A method for determining the flux vector of a rotating field machine, comprising the steps of:
    (a) forming, from the current ($i_s$) and the voltage ($u_s$) of the stator of the machine, the EMF-vector ($e_s$) of the machine;
    (b) modifying the EMF vector by a feedback signal ($\dot{\beta} = \varphi_s$) derived from the flux vector to form a modified EMF vector ($e_\beta$);
    (c) integrating the modified EMF vector ($e_\beta$) to form the flux vector;
    (d) said step of modifying comprising forming the modified EMF-vector ($e_\beta$) in a coordinate system derived from the feedback signal ($\dot{\beta}$), one axis of which rotates relative to the stator reference system;
    (e) said step of integrating comprising integrating the modified EMF vector in the rotating coordinate system, taking a rotary EMF component ($e_\beta^R$) into consideration; and
    (f) forming the feedback signal ($\dot{\beta}$) from the flux vector such that the frequency of the coordinate system is slaved to the motion of the flux vector ($\psi_\beta$).

2. The method recited in claim 1, wherein the frequency ($\dot{\beta}$) of the coordinate system is determined by the provision that the direction deviation ($\psi_{\beta 2} = \psi \sin(\varphi_s - \beta)$) of the flux vector relative to an axis of the rotating coordinate system is picked up and leveled out relative to an axis of the rotating coordinate system.

3. The method recited in claim 1, wherein the frequency of the coordinate system is determined by the fact that the direction deviation ($\sin(\varphi_s^* - \beta)$) of a coordinate axis from the direction ($\varphi_s^*$) of a reference vector for the flux of the machine is determined and is leveled off.

4. The method recited in claim 1, wherein through leveling off the difference between the determined flux vector and the reference vector, a correction vector ($\Delta\psi^*$) is determined which is added to the EMF vector.

5. The method recited in claim 1, wherein the EMF vector is smoothed with a smoothing time constant ($t$) to form the modified EMF vector ($e_\beta$) in the rotating coordinate system and wherein the flux vector ($\psi_\beta$) is formed as a sum vector from the integrated modified EMF vector and the modified EMF vector multiplied by the smoothing time constant.

6. The method recited in claim 4, wherein a further correction vector ($\delta\psi$) is impressed on the EMF vector which is rotated relative to the flux vector ($\psi_\beta$) and the magnitude of which is proportional to a volatile quantity ($\psi - \psi^*$) of the flux vector.

7. The method recited in claim 6, wherein said further correction vector ($\delta\psi$) is determined as a function of the speed of rotation ($\dot{\beta}$) of the coordinate system, and preferably as a function of the speed of rotation ($\dot{\beta}$) and a state variable (W) of the machine.

8. The method recited in claim 1 adapted for the control of the operation of a converter-fed rotating-field machine, the components of the stator current of which parallel and perpendicular to the field of the machine can be varied independently as a function of field-oriented control variables, wherein the control variables for controlling the converter are determined using the direction of the determined flux vector.

9. Apparatus for determining the flux vector of a rotating field machine comprising:
    (a) an EMF-detector for determining the EMF vector of the machine;
    (b) computing means following the EMF detector for forming an EMF vector modified by a feedback signal ($\dot{\beta}$);
    (c) integration means for forming the flux vector as an integral of the modified EMF vector;
    (d) said computing means comprising means processing the feedback signal ($\dot{\beta}$) for fixing a rotating coordinate system rotated relative to a stator-oriented coordinate system and transforming means for forming the components of the EMF vector in the rotating coordinate system;
    (e) said integration means comprising an integrator for the components of a sum vector formed by a first adding means from the transformed EMF vector and a rotary vector ($e_\beta^R$) which can be derived from the integrated sum vector through rotation by $\pi/2$ and multiplication by the rotation frequency of the coordinate system, said flux vector being taken off at the output of the integrator; and
    (f) means for feeding a quantity characterizing the direction deviation ($\varphi_s - \beta$ and $\varphi_s^* - \beta$ respectively) to respective angle controllers, the output signals ($\dot{\beta}$) of which determine, as the feedback signal, the frequency of rotation of the coordinate system.

10. The apparatus recited in claim 9, wherein the EMF-detector comprises a first subtraction stage for the voltage vector ($u_s$), to the subtrahend of which the product of the stator current vector ($i_s$) and a parameter ($r^s$) of the stator resistance as well as the output vector ($e_s$) of a second subtraction stage are fed; the output vector of the first subtraction stage being impressed via integrating means on the second subtraction stage, to the subtrahend input of which the product of the stator current vector ($i_s$) and a parameter ($l^\sigma$) of the leakage inductance of the machine is fed; vector rotator means for forming the EMF vector in the rotating coordinate system; and further adding means coupled to the output of the integration means, the integrated output vector of the first adding means and the output vector of the vector rotator means being impressed thereon.

11. The apparatus recited in claim 9, wherein an output vector of a correction vector former means is impressed on the first adding means and the correction former means comprises a function generator responsive to the feedback signal ($\dot{\beta} \approx \varphi_s$) for forming a control vector ($\epsilon(\dot{\beta}, W)$) and a magnitude modifier for forming the correction vector ($\delta\psi$) by multiplication of the control vector ($\epsilon(\dot{\beta}, W)$) with a volatile quantity ($\psi - \psi^*$) of the flux vector.

* * * * *